(12) United States Patent
Chen et al.

(10) Patent No.: US 8,385,664 B2
(45) Date of Patent: Feb. 26, 2013

(54) METHOD FOR PROGRESSIVE JPEG IMAGE DECODING

(75) Inventors: Yu-Chi Chen, Hsinchu (TW); Chi-Wen Huang, Taichung County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1054 days.

(21) Appl. No.: 12/138,446

(22) Filed: Jun. 13, 2008

(65) Prior Publication Data

US 2008/0310741 A1    Dec. 18, 2008

(30) Foreign Application Priority Data

Jun. 14, 2007  (TW) ................................ 96121492 A

(51) Int. Cl.
*G06K 9/36* (2006.01)
*G06K 9/46* (2006.01)

(52) U.S. Cl. ........................................................ 382/232
(58) Field of Classification Search ........................ None
See application file for complete search history.

(56) References Cited

U.S. PATENT DOCUMENTS

| | | | | |
|---|---|---|---|---|
| 5,724,070 A | * | 3/1998 | Denninghoff et al. | 345/547 |
| 5,815,097 A | * | 9/1998 | Schwartz et al. | 341/51 |
| 6,111,566 A | * | 8/2000 | Chiba et al. | 345/555 |
| 6,141,453 A | * | 10/2000 | Banham et al. | 382/240 |
| 6,345,126 B1 | * | 2/2002 | Vishwanath et al. | 382/253 |
| 6,356,665 B1 | * | 3/2002 | Lei et al. | 382/240 |
| 6,608,933 B1 | * | 8/2003 | Dowell et al. | 382/232 |
| 6,664,902 B2 | * | 12/2003 | Andrew et al. | 341/50 |
| 7,187,802 B2 | | 3/2007 | Ju | |
| 7,313,281 B2 | | 12/2007 | Ju | |
| 7,409,096 B2 | * | 8/2008 | Martin | 382/233 |
| 7,587,093 B2 | * | 9/2009 | Lee | 382/250 |
| 2001/0002937 A1 | * | 6/2001 | Warner et al. | 382/232 |
| 2007/0098275 A1 | * | 5/2007 | Lee et al. | 382/233 |

OTHER PUBLICATIONS

Information Technology—Digital Compression and Coding of Continuous-Tone Still Images—Requirement and Guidelines, ITU T.81 ISO/IEC 10918-1 : 1993(E).*

* cited by examiner

*Primary Examiner* — Samir Ahmed

(74) *Attorney, Agent, or Firm* — Jianq Chyun IP Office

(57) ABSTRACT

A progressive JPEG image decoding method is provided. In the decoding method, a non-zero history table and a sign table of each variable length decoding (VLD) result are recorded and used as a reference for decoding the next scan layer. The decoded coefficients are no longer directly stored in a memory so as to save the memory space. Accordingly, an image can be decoded and displayed correctly even with limited memory space.

5 Claims, 3 Drawing Sheets

METHOD FOR PROGRESSIVE JPEG IMAGE DECODING

CROSS-REFERENCE TO RELATED APPLICATION

This application claims the priority benefit of Taiwan application serial no. 96121492, filed on Jun. 14, 2007. The entirety of the above-mentioned patent application is hereby incorporated by reference herein and made a part of specification.

BACKGROUND OF THE INVENTION

1. Field of the Invention

The present invention generally relates to an image decoding method, in particular, to a progressive JPEG image decoding method.

2. Description of Related Art

According to the joint photographic experts group (JPEG) compression technique based on progressive discrete cosine transformation (DCT), an image is encoded by scanning the entire image several times so that the encoded JPEG data stream contains the data of a plurality of scan layers. Accordingly, while decoding the image, data of all these scan layers has to be decoded to re-establish the original image. Moreover, since each of the scan layers carries part of the characteristics of the original image, the image decoded from each scan layer roughly presents the original image, and the quality of the decoded image is increased along with the number of decoded scan layers.

FIG. 1 illustrates a conventional progressive JPEG image decoding apparatus. Referring to FIG. 1, the decoding apparatus 100 includes a variable length decoding (VLD) apparatus 110, a memory apparatus 120, an inverse quantizer 130, and an inverse DCT (IDCT) apparatus 140. The decoding apparatus 100 processes a decoding procedure based on progressive DCT, and the decoding procedure will be described below.

First, an encoded JPEG data is processed by the VLD apparatus 110. Since the information of a previous scan layer has be to referred when the VLD apparatus 110 processes each scan layer, the processing result has to be stored in the memory apparatus 120 having the same size as the image to be used by the VLD apparatus 110 for processing the next scan layer. All the coefficients of a scan layer collected by the memory apparatus 120 are sequentially sent to the inverse quantizer 130 and the IDCT apparatus 140 so that an inverse quantization and an IDCT are performed thereto to obtain the decoded pixels and re-establish the progressive image. In the method described above, the size of the image is restricted by the memory space even though the image can present the progressive characteristic. Accordingly, the efficiency in the usage of the memory space has to be improved.

A progressive JPEG image decoding method is provided by U.S. Pat. No. 7,313,281, wherein some decoded pixels of an image and a non-zero history table are generated for each scan layer, and the decoded pixels generated by each scan layer are accumulated in a predetermined order, and the non-zero history table generated by each scan layer is updated. In foregoing method, memory space is saved by referring to non-zero history records. However, the non-zero history records can only be used as reference during Huffman decoding, while before accumulating the decoded coefficients of each scan layer, the previous decoding result at the same address still has to be referred in order to perform a power of two adjustment to the decoded coefficients and obtain correct decoded coefficients.

For example, a value −9 is expressed as 11110111 in 8 binary bits. However, it is the absolute value of −9 which is encoded during Huffman encoding, namely, |−9|=(00001001). If bits 7~3 (among bits 0~7) are encoded first and then the other bits are encoded one by one, the first encoding process encodes the first 5 bits (00001) and 0 (0 is negative and 1 is positive), the second encoding process encodes 0, the third encoding process encodes 0, and the fourth encoding process encodes 1. Accordingly, when a decoder receives the first data, it understands from the bit value 0 that this is a negative value, thus, a signed power of two adjustment is performed to (00001), wherein the complement of (00001) is first obtained as (11110), and a power of two calculation is then performed to the complement (11110) to obtain (11110000). Next, the results of the second and the third decoding processes are both 0, which means the values are both null, and the result of the fourth decoding process is 1, which means the value is not null, then the binary value of −1 is obtained as (11111111) according to the negative sign recorded in a sign table. However, because the bit corresponding to the scan layer decoded in the fourth decoding process is bit 0, foregoing result (11111111) has to be shifted 0 bit leftward to obtain (111111111), which denotes value −1. After adding all the decoded values, the decoded coefficient −9 is eventually obtained as (11111000)+0+0+(111111111) =(11110111) and the decoding operation is completed. However, in U.S. Pat. No. 7,313,281, the power of two adjustment to the accumulated value is not provided, thus, decoding error may be caused so that incorrect image may be presented.

SUMMARY OF THE INVENTION

Accordingly, the present invention is directed to a progressive JPEG image decoding method, wherein a non-zero history table and a sign table are used for replacing the decoding result of a previous scan layer so that the usage of a memory is reduced.

The present invention provides a progressive JPEG image decoding method suitable for decoding a bit stream data into an image data. The bit stream data includes the data of a plurality of scan layers. The decoding method includes following steps: a. sequentially receiving the data of a scan layer of the bit stream data; b. decoding the data of the scan layer into a plurality of decoded coefficients according to a non-zero history table; c. performing a signed power of two adjustment to the decoded coefficients according to a sign table; d. updating the non-zero history table and the sign table according to the decoded coefficients; e. outputting the decoded coefficients.

According to an embodiment of the present invention, step b. includes performing a run length decoding to the data of the scan layer according to the non-zero history table to respectively obtain the value of the decoded coefficients, and step c. includes adding a sign to the value of each decoded coefficient according to the sign table and multiplying the value of each decoded coefficient by a power of two according to the position of the image data bit corresponding to the currently decoded scan layer in the binary sequence.

According to an embodiment of the present invention, step e. includes performing an inverse quantization and an inverse discrete cosine transformation (DCT) to the decoded coefficients and outputting the decoded coefficients converted by a converter. In addition, the decoded coefficients are accumulated to the decoded coefficients output previously.

According to an embodiment of the present invention, after step e., the progressive JPEG image decoding method further includes determining whether or not a last decoded scan layer is the last scan layer, wherein if the scan layer is not the last scan layer, the decoding procedure returns to step a. to decode the data of the next scan layer; otherwise, if the scan layer is the last scan layer, the decoding procedure is terminated.

According to an embodiment of the present invention, the accumulated decoded coefficients are the completed image data when the data of all the scan layers in the bit stream data has been decoded.

The present invention provides a progressive JPEG image decoding method suitable for decoding a bit stream data into an image data. The bit stream data includes the data of a plurality of scan layers. The decoding method includes following steps: a. dividing the scan layers into a plurality of decoding areas; b. sequentially selecting one of the decoding areas as a partial decoding area; c. sequentially receiving the data of a scan layer of the bit stream data, decoding the data in the partial decoding area of the scan layer according to a non-zero history table and a sign table to output a plurality of local decoded coefficients, and updating the non-zero history table and the sign table; d. sequentially receiving the data of a next scan layer of the bit stream data, repeating step c. to decode the data in the partial decoding area of the next scan layer so as to output the local decoded coefficients, and updating the non-zero history table and the sign table until the data in the partial decoding areas of all the scan layers has been decoded.

According to an embodiment of the present invention, step c. includes performing an inverse quantization and an inverse DCT (IDCT) to the local decoded coefficients and outputting the local decoded coefficients converted by a converter. In addition, the local decoded coefficients are accumulated to the local decoded coefficients output previously.

According to an embodiment of the present invention, step c. includes performing a run length decoding to the data of the scan layer according to the non-zero history table to obtain the value of the decoded coefficients and performing a signed power of two adjustment of the value of each decoded coefficient according to the sign table.

According to an embodiment of the present invention, in step a., the size of the decoding areas is determined according to the size of the memory, and the same method is used for dividing each scan layer.

According to an embodiment of the present invention, step c. further includes recording the last decoding address of the partial decoding area of the scan layer as the starting point of the partial decoding area of the next scan layer.

According to an embodiment of the present invention, before receiving the data of the scan layer, step c. further includes: loading the last decoding address of the previous scan layer before decoding the data of the next decoding area of the scan layer, then decoding the data of the next partial decoding area from the last decoding address, and eventually repeating foregoing steps to decode the data in the partial decoding areas of all the scan layer and outputting the results as part of the image data.

According to an embodiment of the present invention, after step d., the decoding method further includes: determining whether or not all the data in all the decoding areas has been decoded; if there is still data to be decoded, steps b~d are repeated to select the next partial decoding area of the first scan layer and decode the data thereof until the data in all the decoding areas has been decoded.

According to an embodiment of the present invention, the complete image data is obtained when the data in all the decoding areas of all the scan layers in the bit stream data has been decoded.

In the present invention, a non-zero history table and a sign table are used for replacing the decoding result of a previous scan layer. Thus, there is no need to keep various decoded coefficients of the previous scan layer in the memory, so that a JPEG image can be decoded and displayed correctly even with limited memory space.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
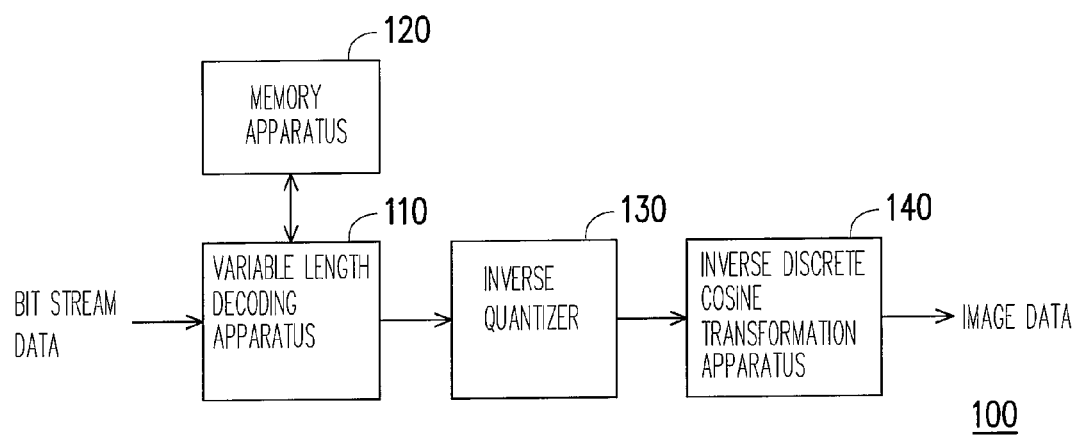
FIG. 1 illustrates a conventional progressive JPEG image decoding apparatus.

Reference will now be made in detail to the present preferred embodiments of the invention, examples of which are illustrated in the accompanying drawings. Wherever possible, the same reference numbers are used in the drawings and the description to refer to the same or like parts.

In a progressive JPEG image decoding method, the data of a previous scan layer has to be referred while decoding a scan layer, namely, during a decoding process, a memory space having the size of an image has to be used for recording the data of the previous scan layer in order to decode the current scan layer correctly. Accordingly, this method consumes a lot of memory space. In the present invention, a progressive JPEG image decoding method is provided for resolve foregoing problem, wherein a non-zero history table and a sign table are recorded for replacing the decoding result of the previous scan layer so that the usage of memory space is considerably reduced. Embodiments of the present invention will be described below with reference to accompanying drawings.

First Embodiment

Figure 2:
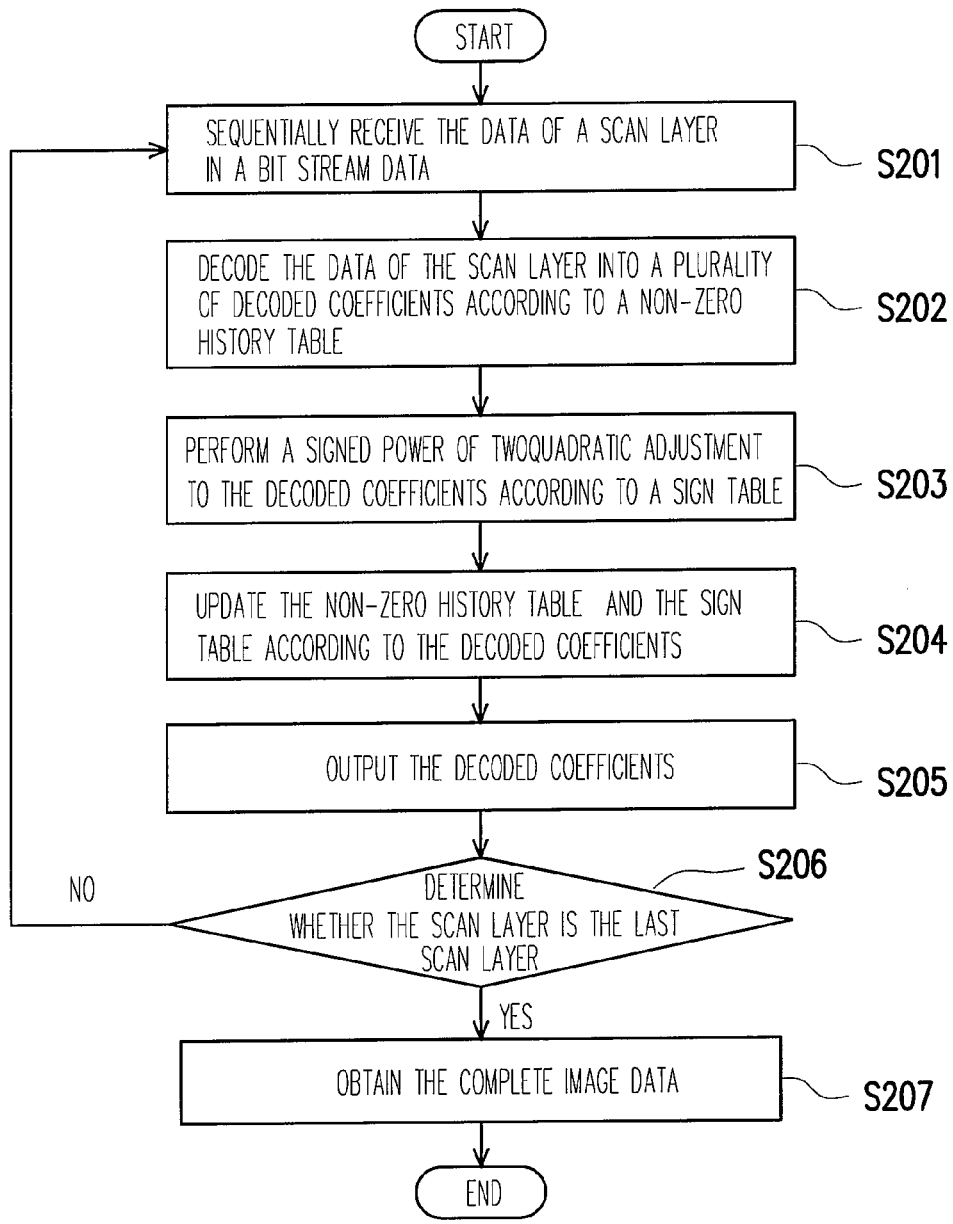
FIG. 2 is a flowchart illustrating a progressive JPEG image decoding method according to a first embodiment of the present invention.

FIG. 2 is a flowchart illustrating a progressive JPEG image decoding method according to a first embodiment of the present invention. Referring to FIG. 2, the progressive JPEG image decoding method in the present embodiment is suitable for decoding a bit stream data into an image data, wherein the bit stream data includes the data of a plurality of scan layers. Below, the decoding method in the present embodiment will be described in detail.

First, the data of a scan layer of the bit stream data is sequentially received (step S201). The scan layers are arranged in a particular order, and in the present embodiment, the first received scan layer data is the scan layer data in the head of the bit stream data.

Next, the received scan layer data is decoded according to a non-zero history table so as to obtain the decoded coefficients of the pixels in the scan layer (step S202). In this step, a run length decoding is performed to the scan layer data to obtain the decoded coefficients. After that, a signed power of two adjustment is performed to the decoded coefficients according to a sign table (step S203).

To be specific, in a progressive JPEG image decoding method, the decoding result of a previous scan layer has to be referred (i.e. whether the decoded coefficients thereof are non-zero?) while decoding the data of a current scan layer by using a variable length decoding (VLD) apparatus. Thus, in the present embodiment, a non-zero history table has to be referred while decoding the data of a scan layer, and while generating the decoded coefficients of the scan layer, the non-zero history record of the decoded coefficients has to be recorded to be referred while decoding the data of a next scan layer.

According to another characteristic of progressive image decoding, the signs of a decoding result at the same address have to be referred in order to adjust the signs of the decoded coefficients before they are output. Thus, in the present invention, besides the non-zero history table for recording whether the pixels in a scan layer are zeros, a sign table is also required for adjusting the signs of the decoded coefficients.

Moreover, in the conventional progressive image decoding method, the complete image data is recorded in different scan layers, and more image information, accordingly a clearer decoded image, is obtain after the data of each scan layer is decoded. To be specific, assuming the value of a pixel consists a plurality of bits and the data of only one or some of these bits is recorded in each scan layer, then the image information of only one or some bits of the pixel value is obtained after the data of a scan layer is decoded, and accordingly, an incomplete image is obtained. A clear image can only be obtained while the data of all the scan layers have been decoded and all the bits of the pixels are combined together. According to the decoding method described above, a user can get to know roughly about the content of an image before the complete image is decoded.

As described above, the bit information contained in each scan layer is constant. Thus, in the present invention, besides referring to the sign table for adding a sign to each decoded coefficient, each decoded coefficient is multiplied by a power of two according to the position of the image data bit corresponding to the current scan layer in a binary sequence in order to obtain the pixel value corresponding to the bit.

Figure 3:
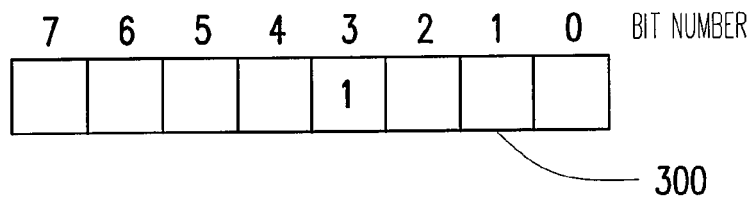
FIG. 3 illustrates an example of a binary sequence according to the first embodiment of the present invention.

For example, assuming a complete pixel value consists 8 bits (recording pixel values 0~255), if the bit corresponding to the current scan layer is bit 3 and the bit is not null and is positive (as shown in FIG. 3), then the pixel value obtained accordingly is $2^3=8$.

After the decoded coefficients of the scan layer are obtained, the non-zero history table and sign table corresponding to the decoded coefficients can be further calculated according to the bit information and the signs of these decoded coefficients (step S204). The non-zero history table and sign table corresponding to the decoded coefficients of the previous scan layer are then updated to those corresponding to the decoded coefficients of the current scan layer and used for decoding the data of a next scan layer.

Additionally, the decoded coefficients are output to an external frame buffer to be displayed on a computer screen (step S205). According to the standard of progressive JPEG image decoding, an inverse quantization (IQ) and an inverse discrete cosine transformation (IDCT) are further performed to these decoded coefficients, and furthermore, these decoded coefficients may also be converted by using a converter according to the requirement of a user so as to allow the user to get an image of appropriate size.

Finally, whether or not the currently decoded scan layer is the last scan layer in the bit stream data is determined (step S206). If the currently decoded scan layer is not the last layer in the bit stream data, which means there is still data of scan layer to be decoded, step S201 is executed again to decode the data of the next scan layer; otherwise, if the currently decoded scan layer is the last scan layer, which means the data of all the scan layers has been decoded, a complete image data is obtained after accumulating the decoded coefficients (step S207).

It should be noted that the decoded coefficients of the next scan layer are also performed with an IQ and an IDCT before they are output and accumulated to the decoded coefficients output previously, and because the accumulated decoded coefficients contain more bits of the image data, a displayed image becomes clearer.

In overview, in the present embodiment, through the characteristic that each scan layer only records a constant bit information of an image, a non-zero history table and a sign table which require only two bits are used for replacing the decoded coefficients of an entire scan layer recorded originally for subsequent reference. Accordingly, the memory space required for recording the decoded coefficients is saved and the image can be decoded and displayed even with limited memory space. Below, the detailed procedure for recording the non-zero history table and the sign table will be explained in another embodiment of the present invention.

Second Embodiment

In the present embodiment, the encoding/decoding procedures of actual decoded coefficients are explained. With a decoded coefficient −9 as an example, −9 is expressed as 11110111 in binary, and as described in the conventional technique, Huffman encoding is performed to the absolute value of a coefficient, thus, the absolute value of −9 is obtained as: |−9|=0000100. In the present embodiment, it is assumed that the coefficient −9 is encoded in four scan layers, the first 5 bits (00001, namely −1) is encoded first, and run length encoding is adopted.

The format of run length encoding is Table(RRRRSSSS) AA(K), wherein K is the first non-zero value after several zero values, RRRR refers to the zero values before K, SSSS refers to the bit number of K, and AA(K) shows appropriates bits representing K. In addition, RRRRSSSS is an 8-bit binary sequence obtained by using RRRR as bits 7~4 and SSSS as bits 3~0 of the binary sequence. While encoding, a complement of the coefficient is encoded if the value of the coefficient is negative. After RRRRSSSS is obtained, a codeword having least bits is obtained through a lookup table, namely, Table(RRRRSSSS), wherein the table is a reference table generated according to the occurrence probability of RRRRSSSS. Next, 0, 0, 1 are sequentially encoded in the second, third, and fourth encoding processes and these values are all attached to the next non-zero value.

In the step of encoding value −1, the RRRR value corresponding to −1 is 0, the SSSS value thereof is 1, and AA(K) =0. Assuming the codeword obtained through lookup table is Table(RRRRSSSS)=1011, then a compressed code 10110 is obtained by combining foregoing codeword and AA(K), which is 0.

On the other hand, during Huffman decoding, a run length decoding is performed to −1 to obtain the binary value thereof (i.e. 11111111). Because the bits corresponding to the current scan layer is bits 7~3, foregoing decoded value (11111111) has to be shifted 3 bits leftward to obtain (11111000), which represents the value −8, and here a negative sign of the decoded coefficient is recorded in the sign table.

Thereafter, the decoding results of the second and third decoding processes are both 0, which means the values are null. The decoding result of the fourth decoding process is 1, which means the value is not null, and the binary value of −1 (i.e. 11111111) is then obtained according to the negative sign in the sign table. However, because the bit corresponding to the scan layer in the fourth decoding process is bit 0, the decoded value (11111111) is shifted 0 bit leftward to obtain (111111111), which represents the value −1. The decoded coefficient −9 is obtained after adding all the decoded values, which is (11111000)+0+0+(111111111)=(11110111). In short, in the present embodiment, −9 is transmitted by dividing into −8, 0, 0 and −1.

As described above, in the progressive JPEG image decoding method of the present invention, the signs of the decoded coefficients have to be determined according to the sign table besides referring to the non-zero history table of the previous scan layer, thus, correct decoded coefficients can be generated. Moreover, in the present invention, a signed power of two adjustment is performed to each decoded coefficient so that an image can be decoded and displayed correctly.

On the other hand, the present invention further provides a progressive JPEG image decoding method, wherein the scan layers are divided into a plurality of decoding areas according to the size of a system memory and these decoding areas are respectively decoded by referring to the non-zero history table and sign table described above, so that the memory required for decoding an image is considerably reduced. Below, an embodiment of foregoing method will be explained in detail.

Third Embodiment

Figure 4:
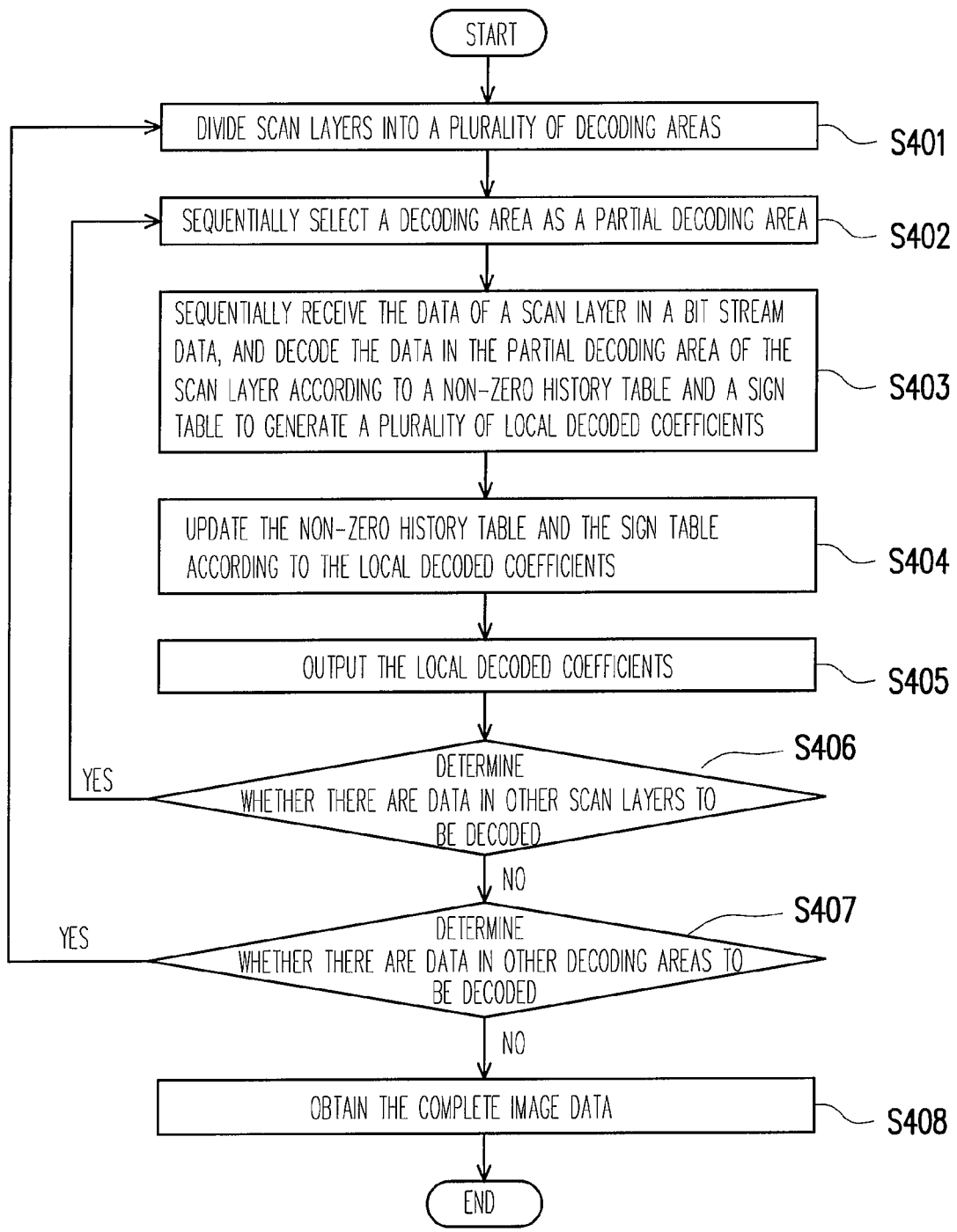
FIG. 4 is a flowchart illustrating a progressive JPEG image decoding method according to a third embodiment of the present invention.

FIG. 4 is a flowchart illustrating a progressive JPEG image decoding method according to a third embodiment of the present invention. Referring to FIG. 4, the progressive JPEG image decoding method in the present embodiment is suitable for decoding a bit stream data into an image data, wherein the bit stream data includes the data of a plurality of scan layers. Below, the decoding method in the present embodiment will be described in detail.

First, the scan layers are divided into a plurality of decoding areas (step S401). The size of the divided decoding areas is determined according to the capacity of the memory, namely, first the number of image blocks can be processed during a decoding process is determined according to the size of the memory, and then the scan layers are divided into a plurality of decoding areas according to this number.

Next, the decoding areas are sequentially selected as a partial decoding area (step S402). The scan layers are arranged in a particular order, thus, in the present embodiment, the first received scan layer data is the scan layer data in the front of the bit stream data.

Thereafter, the data of a scan layer in the bit stream data is sequentially received, and the data in the partial decoding area of the scan layer is decoded according to a non-zero history table and a sign table to generate a plurality of local decoded coefficients (step S403). To be specific, a run length decoding is performed to the data of the scan layer according to the non-zero history table to obtain various decoded coefficients, and then a signed power of two adjustment is performed to each decoded coefficient according to the sign table, wherein the detailed decoding method is the same as or similar to that described in the first embodiment and therefore will not be described herein.

While generating the local decoded coefficients, the non-zero history table and the sign table are also updated according to the local decoded coefficients (step S404). Because in a progressive JPEG image decoding method, the decoding result of a previous scan layer has to be referred for decoding the data of a current scan layer, in the present embodiment, the local decoded coefficients are replaced by a non-zero history table and a sign table for decoding the data of a next scan layer at the same time when these local decoded coefficients are generated.

It should be mentioned that in the present embodiment, while receiving the data of a scan layer at the beginning, a starting address of the scan layer is first located, and the data of the scan layer is then decoded from this starting address. In addition, in the present embodiment, after the data in a partial decoding area of a scan layer is decoded, the last decoding address in the partial decoding area is recorded as the starting point for decoding the next partial decoding area. On the other hand, the last decoding address recorded previously is loaded every time before decoding the data in a partial decoding area of a scan layer, so that the decoding process can be carried out right after the previous partial decoding area. As described above, only the last decoding address is recorded every time after decoding a partial decoding area, so that it is not necessary to store the starting points of all the partial decoding areas in advance, and accordingly less memory space is used.

Next, the local decoded coefficients are performed with an IQ and an IDCT and output as part of the image data (step S405), wherein foregoing local decoded coefficients may be further converted by a converter, but the present invention is not limited thereto.

Whether there are data of other scan layers to be decoded is determined after the data of a decoding area in a scan layer is decoded and the local decoded coefficients are output (step S406). If there is still data to be decoded, step S403 is executed again to receive the data in the same partial decoding area of the next scan layer and decode the data according to the non-zero history table and the sign table recorded previously to generate new local decoded coefficients until the data of all the partial decoding areas have been decoded. The newly generated local decoded coefficients are output and accumulated to the local decoded coefficients output previously, and the displayed image becomes clearer because the accumulated decoded coefficients contain more bit information of the image.

Finally, whether there are still data of other decoding areas to be decoded is determined after the data in a decoding area is decoded (step S407). If there are still data of other decoding areas to be decoded, step S402 is executed again to select the next partial decoding area and decode the data therein until the data in all the decoding areas have been decoded and a complete image data is obtained (step S408).

In the present embodiment, the number of non-zero history tables and sign tables of image blocks that can be stored during a decoding process is determined according to the size of a memory, and the scan layers are divided into a plurality of decoding areas according to this number. The data in the same decoding area of all the scan layers is decoded during each decoding process, and the data in a next decoding area of all the scan layers is decoded during the next decoding process. The decoded coefficients are output first, and a non-zero history table and a sign table are used for decoding the next scan layer. Accordingly, the memory space used in the present invention is considerably reduced.

In overview, in the progressive JPEG image decoding method provided by the present invention, a non-zero history table and a sign table of each variable length decoding result are recorded for replacing the decoded coefficients used in the conventional technique. Thus, in the present invention, less memory space is used so that an image can be decoded and displayed correctly even with limited memory space.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A progressive JPEG image decoding method suitable for decoding a bit stream data into an image data, the bit stream data comprising data of a plurality of scan layers, the progressive JPEG image decoding method comprising:
   a. sequentially receiving the data from one of the scan layers in the bit stream data;
   b. sequentially decoding the data of the scan layer into a plurality of decoded coefficients according to a non-zero history table, which comprises a first additionally stored table to indicate whether each of the plurality of decoded coefficients is zero or not by using an one bit value to represent each of the plurality of decoded coefficients;
   c. performing a signed power of two adjustment to the decoded coefficients according to a sign table, which comprises a second additionally stored table to indicate whether the sign of each of the plurality of decoded coefficients is positive or negative by using an one bit value to represent the sign of each of the plurality of decoded coefficients, and the signed power of two adjustment comprises:
      obtaining the sign for a decoded coefficient from the sign table;
      if the sign is positive, performing a power of two adjustment to the decoded coefficient;
      if the sign is negative, performing two's compliment conversion to the decoded coefficient to produce a converted decoded coefficient;
      performing a power of two adjustment to the converted decoded coefficient; and
      adding the converted decoded coefficient with accumulated coefficients from previous layers to produce a signed power of two adjusted decoded coefficient;
   d. updating the non-zero history table and the sign table according to the signed power of two adjusted decoded coefficients; and
   e. outputting the signed power of two adjusted decoded coefficients.

2. The progressive JPEG image decoding method according to claim 1, wherein step b, comprises:
   performing a run length decoding to the data of the scan layer according to the non-zero history table to obtain the decoded coefficients.

3. The progressive JPEG image decoding method according to claim 2, wherein step c, comprises:
   adding a sign to the value of each of the decoded coefficients according to the sign table; and
   respectively multiplying the decoded coefficients by a power of two according to the position of the recorded bit from the scan layer decoded currently corresponding to the image data in a binary sequence.

4. The progressive JPEG image decoding method according to claim 1, wherein step e, comprises:
   converting the decoded coefficients by using a converter and then performing an inverse quantization and an inverse discrete cosine transformation (DCT) to the decoded coefficients, and outputting the decoded coefficients; and
   accumulating the decoded coefficients to the decoded coefficients output previously.

5. The progressive JPEG image decoding method according to claim 1, wherein after step e, the progressive JPEG image decoding method further comprises:
   determining whether or not the last decoded scan layer is the last scan layer, wherein if the scan layer is not the last scan layer, the decoding method returns to step a, to decode the data of the next scan layer, otherwise the decoding method is terminated, wherein
   the accumulated decoded coefficients are the completed image data when the data of all the scan layers in the bit stream data has been decoded.

* * * * *